(12) United States Patent
Schain et al.

(10) Patent No.: US 6,944,706 B2
(45) Date of Patent: Sep. 13, 2005

(54) SYSTEM AND METHOD FOR EFFICIENTLY PROCESSING BROADBAND NETWORK TRAFFIC

(75) Inventors: Mariano R. Schain, Plano, TX (US); Jeff Mandin, Jerusalem (IL); Lior Storfer, Tel-Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 378 days.

(21) Appl. No.: 10/211,843

(22) Filed: Aug. 2, 2002

(65) Prior Publication Data

US 2003/0161333 A1 Aug. 28, 2003

Related U.S. Application Data

(60) Provisional application No. 60/358,794, filed on Feb. 22, 2002.

(51) Int. Cl.[7] ............................................... G06F 15/16
(52) U.S. Cl. ..................... 710/312; 710/313; 710/316; 709/249; 709/250; 370/401
(58) Field of Search .................................. 710/305–306, 710/308–317, 104–106; 709/230–232, 245–250, 217–234; 370/401, 469, 487, 490

(56) References Cited

U.S. PATENT DOCUMENTS

| | | | | | |
|---|---|---|---|---|---|
| 5,970,066 A | * | 10/1999 | Lowry et al. | ................ | 370/353 |
| 6,032,193 A | * | 2/2000 | Sullivan | ...................... | 709/239 |
| 6,041,356 A | * | 3/2000 | Mohammed | ................. | 709/227 |
| 6,154,839 A | * | 11/2000 | Arrow et al. | ................ | 713/154 |
| 6,324,583 B1 | * | 11/2001 | Stevens | ...................... | 709/230 |
| 6,484,210 B1 | * | 11/2002 | Adriano et al. | ............. | 709/239 |
| 6,618,386 B1 | * | 9/2003 | Liu et al. | ..................... | 370/401 |
| 6,697,864 B1 | * | 2/2004 | Demirtjis et al. | ........... | 709/229 |
| 6,757,731 B1 | * | 6/2004 | Barnes et al. | ................ | 709/227 |

OTHER PUBLICATIONS

Data–Over–Cable Service interface specification DOCSIS 1.1, 2000–2003.*

* cited by examiner

*Primary Examiner*—Paul R. Myers
*Assistant Examiner*—Raymond N Phan
(74) *Attorney, Agent, or Firm*—Abdul Zindani; W. James Brady, III; Frederick J. Telecky, Jr.

(57) ABSTRACT

A broadband gateway 135 that combines a broadband modem 120 and a residential gateway 130 in a single unit. The single unit features a unique dual bridge, shared module architecture that reduces redundancy in the broadband gateway 135 at the same time it minimizes interactions between modules in the broadband gateway 135. This minimized interaction permits the broadband gateway 135 to operate at peak efficiency and allows for continued development of portions of the broadband gateway 135 without necessarily incurring compliance testing for the broadband portion of the broadband gateway 135.

27 Claims, 4 Drawing Sheets

SYSTEM AND METHOD FOR EFFICIENTLY PROCESSING BROADBAND NETWORK TRAFFIC

This application claims priority to the provisional application entitled "Cable Modem Residential Gateway", filed Feb. 22, 2002, Ser. No. 60/358,794, which provisional application is incorporated herein by reference.

FIELD OF THE INVENTION

This invention relates generally to broadband communications, and particularly to providing efficient traffic processing in a residential gateway for both local and external traffic.

BACKGROUND OF THE INVENTION

Broadband connectivity has revolutionized how individuals and small businesses (collectively referred to as subscribers) connect to the Internet, providing high bandwidth connections with relatively low costs. Broadband connectivity is provided to subscribers in many different forms, including but not limited to: coaxial cable (cable), digital subscriber line (DSL), geosynchronous satellite, wireless, and direct point-to-point optical and wireless. Of course, each method of broadband delivery is usually different and normally is not compatible. Regardless of how the connectivity between the subscriber and the Internet is achieved, there is an underlying commonality that exists in all types of broadband. It is the processing that occurs with data/information packets coming into and out of the subscriber's computer(s).

The packets can be divided into one of two groups based on their position in relation to the interface between the subscriber's equipment and the service provider's equipment. Packets can either be local or external. Local packets are packets on the subscriber's side of the interface while external packets are packets on the service provider's side of the interface. Local packets may be packets sent from one computer in the subscriber's network to another in the same subscriber's network (should the subscriber have a computer network) or packets from the subscriber's single computer to itself. When packets are transmitted, processing must be performed on the packets to determine if they are to remain in their respective domains or they are to cross the interface.

A common solution for processing the local and external packets is via the use of a single processing module that performs needed processing for both local and external packets. The single processing module typically resides at the interface itself. The use of a single processing module permits the sharing of resources and eases design by reducing the overall number of interacting modules. However, the sharing of the single processing module places a large burden on processing resources to perform tasks such as address filtering and translation for local addresses. The address filtering and translation processing may interfere with and affect the performance of the processing of external packets, therefore reducing the overall performance.

A fairly common solution to the processing of external and local packets is to create two separate modules that are separately responsible for processing external packets and local packets. By separating the processing, it is much less likely that there would be interference since there is no interaction unless a packet crosses the interface. However, the separation of the processes can result in unnecessary duplication of modules, such as the communications protocol modules.

A need has arisen for method and apparatus that reduces interaction and interference between local and external packet processing and at the same time minimizes the unnecessary duplication of modules.

SUMMARY OF THE INVENTION

In one aspect, the present invention provides a circuit comprising a broadband modem coupled to a broadband medium, the broadband modem comprising a broadband bridge coupled to a broadband connection, the broadband bridge containing circuitry to filter packets, a first Internet protocol (IP) layer coupled to the broadband bridge, the first IP layer to process data packets according to an Internet protocol, a residential gateway comprising a local bridge coupled to a network connection, the local bridge containing circuitry to filter packets, a second IP layer coupled to the local bridge, the second IP layer to process data packets according to the Internet protocol, and the circuit further comprising a virtual data link coupled at a first end to the broadband bridge and at a second end to the local bridge, the virtual data link to allow packets from one bridge to cross into the other.

In another aspect, the present invention provides a method for increasing the efficiency of a broadband gateway, the method comprising the steps of determining a destination and a source address of a packet, processing the packet in a first bridge if the destination and source addresses of the packet are external network addresses, processing the packet in a second bridge if the destination and source addresses of the packet are local network addresses, transferring the packet from one bridge to the other bridge if the destination and source addresses of the packet belong to different networks, and completing the processing of the transferred packet.

The present invention provides a number of advantages. For example, use of a preferred embodiment of the present invention partitions the filtering of network packets into two parts, processing of local packets and external packets, with each type of packet being processed by its own bridge. This partitioning simplifies the job of either bridge, making the design of the bridges simpler. A bridge being a network entity that connects network segments (commonly referred to as physical domains) and logically allowing different devices on different network segments to act as if they are in the same domain.

Also, use of a preferred embodiment of the present invention permits the design of plug-in bridges to meet differing broadband standards. This allows the use of the residential gateway with different broadband standards by simply replacing the broadband modem to meet the particular broadband standard used rather than requiring the design of a complete residential gateway for each broadband standard.

Additionally, use of a preferred embodiment of the present invention allows continued development and refinement of the non-broadband bridge while keeping the broadband bridge the same. This results in not having to recertify compatibility of the residential gateway to the broadband standard since the broadband bridge was not modified, saving time and money.

Also, use of a preferred embodiment of the present invention allows certain modules, such as a single internet protocol (IP) stack, to be shared by the two bridges, making development easier and reducing resource (e.g. memory) requirements.

Additionally, use of a preferred embodiment of the present invention allows for easier achievement of better overall network performance. This is enabled by the processing of the local packets independently from the processing of the external (for example, broadband) packets. This scheme allows easier and simpler resource (i.e. CPU) allocation for the two independent processing functions, and also isolates the processes and letting them perform their assigned tasks without interference.

Also, use of a preferred embodiment of the present invention allows for a natural placement of a firewall, network address translator, and other similar packet filtering mechanisms. This allows for the standardization of the interface to the firewall and the network address translator, easing their design and implementation.

BRIEF DESCRIPTION OF THE DRAWINGS

The above features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

The following discussion focuses on a basic architecture of a broadband gateway for a DOCSIS 1.0 and 1.1 compliant cable modem/residential gateway device. The DOCSIS 1.0 technical standard is specified in a series of documents entitled "Data-Over-Cable Service Interface Specifications", published July 1996 to November 2001, which are incorporated herein by reference. The DOCSIS 1.1 technical standard is specified in a series of documents also entitled "Data-Over-Cable Service Interface Specifications", published Sep. 5, 2001 to Mar. 1, 2002, which are incorporated herein by reference. While the discussion focuses on the DOCSIS compliant cable modem, the present invention is operable with residential gateways operating with other types of standards, including but not limited to the various types of digital subscriber lines (xDSL), geosynchronous satellite, wireless, and direct point-to-point optical and wireless. Therefore, the discussion should not be construed as limiting the present invention to DOCSIS compliant cable modem/residential gateway devices.

Figure 1:
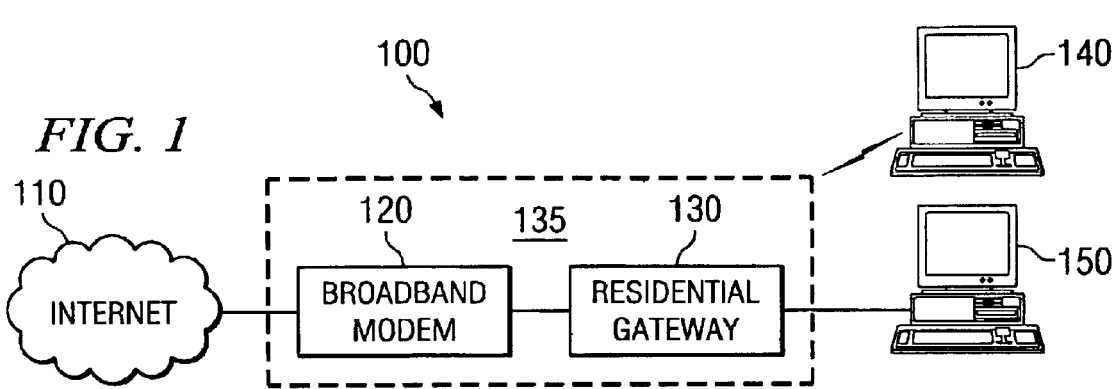
FIG. 1 illustrates a broadband gateway providing an interface between a local network and an external network.

Referring now to FIG. 1, a diagram illustrates a typical installation of a subscriber's computer equipment 140 and 150 with a broadband modem 120 and a residential gateway 130, connecting the computer equipment to a network 110, such as the Internet. While FIG. 1 displays the subscriber's computer equipment being connected to the Internet 110, the computer equipment may be connected to a different external computer network such as the subscriber's employer's private access network. Also note that while the subscriber's equipment is displayed as personal computers, other digital devices may also attach to the data network. Examples of such equipment may include personal data assistants, multimedia players, televisions, etc. In many applications, the broadband modem 120 and the residential gateway 130 maybe combined (logically and/or physically) into a single electronic device, commonly referred to as a broadband modem/residential gateway device 135 (or simply, broadband gateway). The broadband gateway 135 may physically combine the functionality of the broadband modem 120 and the residential gateway 130 into a single convenient package.

The function of the broadband modem 120 is to provide an interface between the broadband connection (in some form, such as cable, dsl, etc.) and the user's computer equipment. The broadband modem 120 converts the data being transmitted on broadband medium into a data format, usually Internet protocol (IP) over Ethernet, which is usable by the computer equipment and vice versa. The residential gateway 130 takes the data provided by the broadband modem 120 and provides it to the subscriber's equipment and vice versa. The residential gateway 130 is also responsible for performing tasks such as address filtering, address translation and context based packet filtering (for example, a firewall). Address filtering and translation is usually required when the subscriber has created a local network connected to the residential gateway 130, and uses a private addressing domain for devices in the local network.

Typically, the subscriber's equipment are arranged in a local area network with its own set of addresses, which is then connected to the external network via the residential gateway 130 and the broadband modem 120. To the external network, the subscriber's equipment appears to be a single address in the external network. The use of a single address to represent the subscriber's local area network enhances security (by hiding the internal addressing scheme) and saves on the total number of global addresses used. The use of a single address is independent of the fact that the subscriber may have anywhere from a single computer or several hundred devices in his local network. All packets going to (or coming from) the subscriber's equipment have a single destination (or origination) address. It is then the task of the broadband gateway 135 to perform the address translation of packets bearing the single destination address that corresponds to the address of the subscriber's local network into the actual address of a particular piece of equipment in the local network. This address translation is commonly called network address translation (NAT).

It is important to note that not all packets that are exiting (entering) the subscriber's local network needs address translation. Some packets are addressed with specific addresses and have specific purposes and do not require (or desire) address translation. In general, there are many types of address filtering and manipulating, network address translation is simply one form of address filtering and manipulating.

Address filtering is used to sort and process packets based on their source and destination addresses. Address filtering can be used to filter traffic between different hosts, multicast (one source to many destinations), and broadcast (one source to all destinations). Address filters can be used to prevent connections to or between certain hosts. For example, all packet traffic is permitted to cross the interface except for traffic with source and/or destination addresses that match certain specified filter rules. The packet traffic matching certain filter rules can be discarded. This affords protection for particular computers or groups of computers without cutting off all network traffic. Alternatively, address filtering can be configured so that only traffic to and from certain hosts will be permitted. This enables access to the external network on a specified group of computers, while protecting other computers from access. Finally, it is important that packet filtering is not performed solely on the addresses (source and destination) of the packet. For example, filtering can be performed on control information (packet header fields, e.g. packet type, packet size), data contained in the packet, and the state of the session (for example, the context of the packet).

Figure 2A:
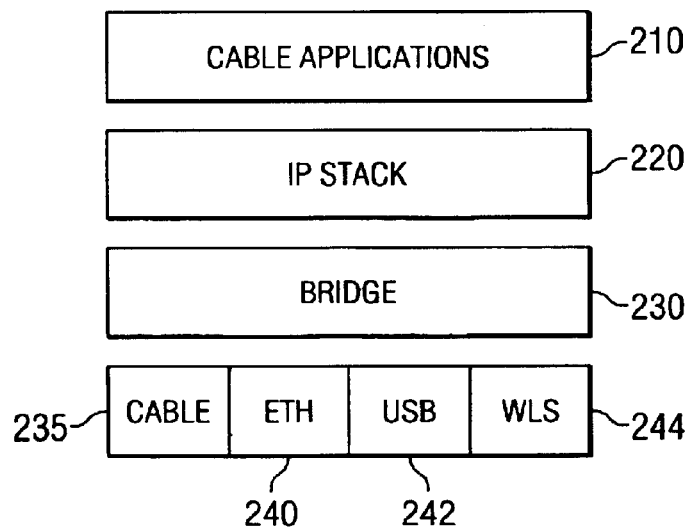
FIG. 2a illustrates a single bridge logical architecture for a cable broadband gateway.

Referring now to FIG. 2a, a diagram illustrates the logical architecture of a prior art single bridge implementation of the broadband gateway 135, with the broadband medium being coaxial cable. The broadband gateway's logical architecture can be broken into several distinct layers. At the bottom of the logical architecture is a driver layer, made up of a cable driver 235 and an Ethernet driver 240, universal serial bus (USB) driver 242, and a wireless driver 244. A driver of a single type, for example, Ethernet driver 240, can support multiple connections of the same type. Other drivers may be present (but not shown) depending on the particular implementation of the broadband gateway. The driver layer typically includes both hardware and software portions. The hardware portion of the driver layer being the physical connection, such as Ethernet connections, USB connections, etc., and the software portion of the driver layer being programs that makes the hardware portion operable. The driver layer implements channel acquisition mechanisms, low-level transmission and reception of packets, cryptography, etc. The cable driver 235 is used to interface the broadband medium (coaxial cable in this instance) to the broadband modem, while the Ethernet 240, USB 242, and wireless 244 drivers (and possibly others) interface the residential gateway to the subscriber's equipment in the local network.

Above the driver layer is a bridge 230. As described earlier, a bridge is used to connect network segments. A bridge may be implemented as 'stand alone' network equipment or as a subsystem of a network device (for example, in a residential gateway). Some broadband communications specifications (DOCSIS, for example) define the bridging functionality as part of the specifications. The bridge 230 provides bridging functionality along with packet filtering schemes as required by the particular broadband (cable modem) and networking (residential gateway) standards used. Above the bridge 230 is an Internet protocol (IP) stack 220. The IP stack 220 is usually provided by the operating system environment of the broadband gateway 135 and is responsible for processing the packets provided by the bridge according to a common protocol format. A typical IP stack will also include an implementation of a comprehensive set of higher layer protocols to support control and end-to-end communications (such as ICMP, TCP, UDP, etc.). The IP stack will also include an interface (for example, a socket interface) to an application layer (located above the IP stack 220) to permit the use of its services. Finally, above the IP stack 220 is a cable applications layer 210. For example, in a DOCSIS cable modem, the cable applications layer 210 implements the DOCSIS socket-based processes. Additionally, the cable applications layer 210 can implement other IP based processes that may not be cable related. Examples of the applications include simple network management protocol (SNMP) agents, trivial file transfer protocol (TFTP) clients, and dynamic host configuration protocol (DHCP) clients. The underlying concepts behind IP stacks, socket-based processes, SNMP agents, TFTP and DHCP clients, etc. are well understood by those of ordinary skill in the art of the present invention and will not be discussed further in this specification.

Using the logical architecture disclosed in FIG. 2a, an external packet entering into the subscriber's network would take a path initially through the broadband modem portion of the logical architecture. When the external packet arrives at the broadband modem via the physical cable (not shown) and is received by the cable driver 235, it receives any necessary processing by the cable driver 235. After processing by the cable driver 235, the external packet is forwarded to the bridge 230 where it may receive any required filtering. If the external packet is destined for the cable modem (i.e., it's destination is one of the IP based processes implemented in the cable applications layer 210), it is forwarded to the IP stack 220. If the external packet is destined for a device in the local network, then it is forwarded into the local network through the appropriate local network interface (for example, the Ethernet driver 240) attached to the bridge 230. The residential gateway processing (i.e. packet filtering, address translation, firewall, etc.) may be applied prior to the packet being forwarded to the local network interface.

An example of an external packet destined for the cable modem would be packets that are used to manage the cable modem. Such packets are often used in the remote management of such modems. The IP packet is then sent to the cable applications layer 210, where it is processed by the appropriate agents, hosts, or clients. In certain implementations, the IP stack 220 may include network address translation and firewall functionality.

Packets that originate in the cable applications layer 210 may be destined for external or local network devices. Those IP packets are sent through the bridge 230 (taking a path down to the IP stack layer 220 and then to the bridge 230). The residential gateway portion of the logical architecture will process (an example of the processing would be network address translation) the packets that are destined for the local network prior to the packets being forwarded to the appropriate local network interface driver, where it is converted into an appropriate format for transmission to its destination. For example, if the subscriber's equipment is connected using an Ethernet based network, the IP formatted packet is encapsulated into Ethernet formatted packets and injected into the Ethernet network by the Ethernet driver 240. Local packets destined for the external network or the Cable Modem application follow a similar, but reversed path.

Local packets from one local source and destined for a local destination would follow a path through the driver layer (for example, through the Ethernet driver 240), the bridge 230, and then back down to the appropriate driver layer. Notice that for local packets that remain in the local network, the packets remain in the residential gateway portion of the broadband gateway 135. A similar path is followed by external packets that do not cross the interface between the external and local networks. If the external packets are not destined for the broadband (cable) modem or local network devices, they may be filtered out by the cable interface. For those external packets destined to the cable modem application layer, the path includes a trip through the bridge 230, the IP stack 220 and the cable applications layer 210.

Figure 2B:
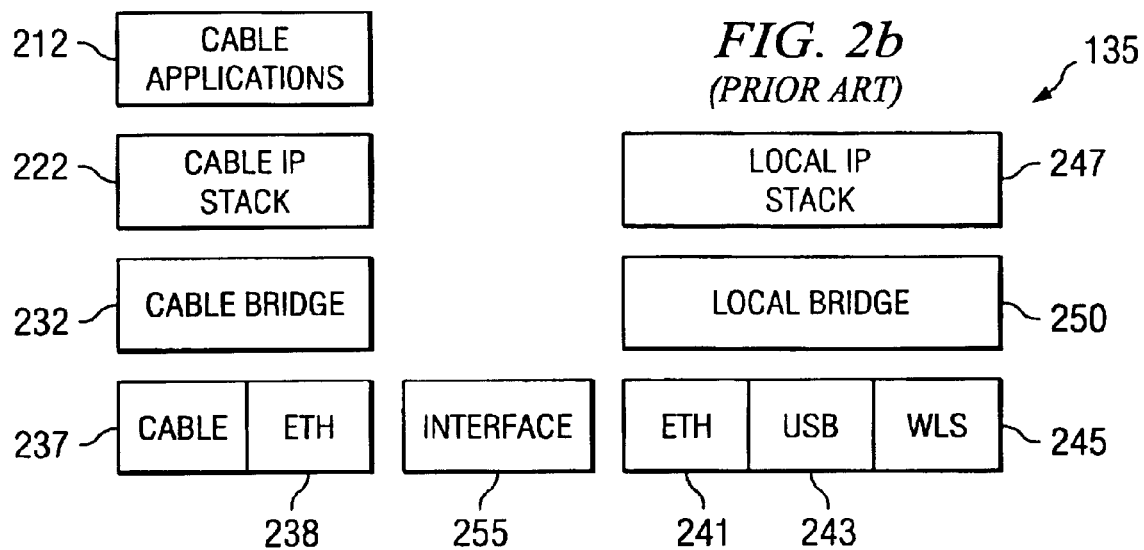
FIG. 2b illustrates a dual bridge logical architecture for a cable broadband gateway.

Referring now to FIG. 2b, a diagram illustrates the logical architecture of a prior art dual bridge implementation of the broadband gateway 135, with the broadband medium being coaxial cable. As in FIG. 2a, the broadband gateway's logical architecture can be broken into several distinct layers. Additionally, the logical architecture is also partitioned into a broadband modem portion and a residential gateway portion. First, the logical architecture of the broadband modem portion of the broadband gateway 135 will be examined. At the bottom of the broadband modem portion are a cable driver 237 and an Ethernet driver 238, followed by a cable bridge 232, a cable IP stack 222, and finally, a cable applications layer 212.

The cable driver 237 and cable applications layer 212 can be identical to the corresponding cable driver 235 and cable applications layer 210 from FIG. 2a. The functionality of the Ethernet driver 238 will be discussed below. The functionality of the cable bridge 232 and the cable IP stack 222, however, are dedicated to the cable modem. This is unlike the single bridge architecture discussed in FIG. 2a, wherein the bridge 230 and the IP stack 220 are shared by both the cable modem and the residential gateway.

The logical architecture of the residential gateway portion of the broadband gateway 135 is as follows: a driver layer that provides support for different network types, for example, an Ethernet driver 241, USB driver 243, and wireless driver 245. Other drivers may be present depending on the particular implementation of the residential gateway. Above the driver layer is a bridge 250 and an IP stack 247. The bridge 250 and the IP stack 247 are dedicated to residential gateway functionality. This is unlike the single bridge architecture discussed in FIG. 2a, wherein the bridge 230 and the IP stack 220 are shared by both the cable modem and the residential gateway.

Coupling the two subsystems together is an Ethernet interface module 255. The Ethernet interface module 255 permits the forwarding of packets between the cable modem and the residential gateway. Note that the packets may or may not be IP packets. Notice also that only the packets that should crosses the local network and external network interface needs to be forwarded through the interface module 255. The interface module 255 connects to the broadband portion via the Ethernet driver 238 and to the residential gateway portion via the Ethernet driver 241. Alternatively, the interface module 255 may use one of a wide variety of other interfaces, such as USB, wireless, etc.

A local packet that is destined to an external address, would follow the following path: starting at the USB driver 243 (or some other driver according to how the device generating the packet is attached to the broadband gateway 135), up through the bridge 250, through the Ethernet driver 241 across the interface module 255 through the Ethernet driver 238 to the cable bridge 232, and down to the cable driver 237. As discussed earlier, only packets that are specifically addressed to the broadband (cable) modem are sent up the cable IP stack 222 and into the cable applications layer 212.

Although the twin bridge logical architecture displayed in FIG. 2b is shown as being a part of a broadband gateway 135, an advantage of the twin bridge architecture is that the two bridges can be implemented in separate devices, i.e., the cable modem portion of the twin bridge architecture can simply be a cable modem while the residential gateway portion can simply be a residential gateway. The Ethernet interface module 255 (or some other type of interconnect, either wired or wireless) would then be connecting both devices through appropriate network interface drivers in the two physically coupled devices.

For example, the broadband gateway 135 as displayed in FIG. 2b can be implemented as a combination hardware and software device. The broadband modem portion could be implemented as a combination software and hardware modem, but the residential gateway portion can be a software application executing on a personal computer directly connected to the broadband modem and any packet address translation and filtering can be performed by the software application, as well as the Internet protocol processing. Other computers and digital devices would couple to the personal computer and not directly to the cable modem. Alternatively, the subscriber may lease (or purchase) a broadband modem from the service provider and purchase a residential gateway from the local computer superstore and connect the two devices into a broadband gateway 135.

Unfortunately, there are inefficiencies in each of the two logical architectures discussed in FIGS. 2a and 2b. The single bridge logical architecture (FIG. 2a) can place an undue processing burden on the processing element handling the IP stack 220 and the bridge 230 resulting from the address filtering and translation of local packets while the dual bridge logical architecture (FIG. 2b) inefficiently replicates the IP stack (one IP stack is required for each bridge) and requires the addition of the interface module 255. Additionally, the single bridge logical architecture of FIG. 2a does not allow for the modular design of the individual layers, making it difficult to develop and update the layers without significantly affecting the other layers.

Figure 3:
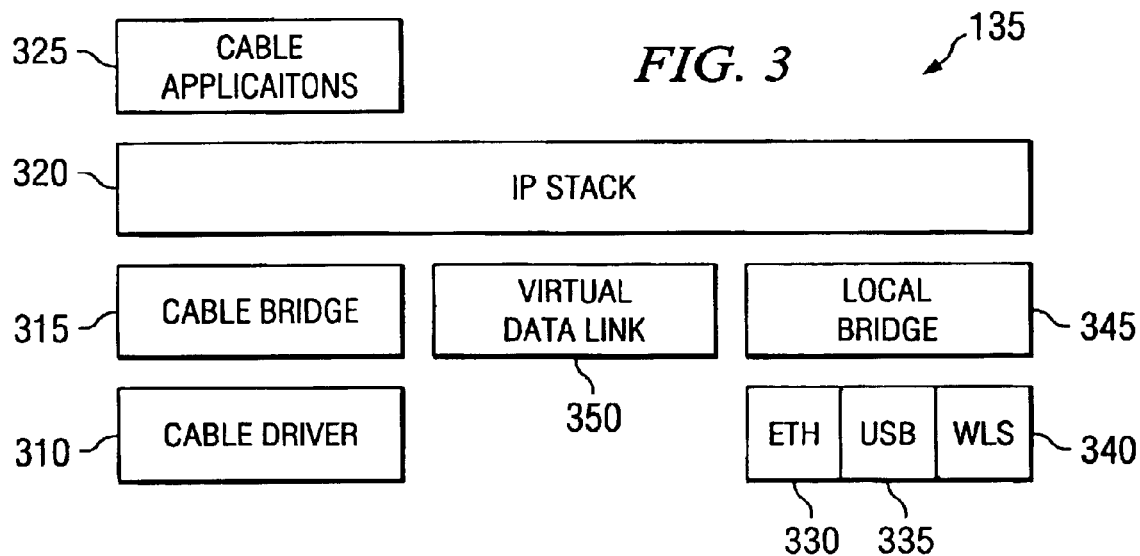
FIG. 3 illustrates a logical architecture of a dual-bridge, shared module cable broadband gateway according to a preferred embodiment of the present invention.

Referring now to FIG. 3, a diagram illustrates the logical architecture of a dual bridge, shared module implementation of a broadband gateway 135 according to a preferred embodiment of the present invention. FIG. 3 displays a broadband gateway 135 having two portions, a broadband modem portion and a residential gateway portion, for the specific case of coaxial cabling being the broadband medium. However, modifications to (or simple replacement of) the cable modem portion of the broadband gateway 135 will permit use of the present invention with other broadband media. The logical architecture features two bridges, one for the broadband modem portion (a cable bridge 315) and one for the residential gateway portion (a local bridge 345) of the broadband gateway 135.

The cable bridge 315 is responsible for processing external packets received at the cable modem and also provides DOCSIS specified filtering of the external packets. The local bridge 345, on the other hand, provides address filtering, general filtering, and translating for local packets and packets crossing the interface. The presence of the local bridge 345 also isolates the remainder of the broadband gateway 135 from local packet flows, for example, local Ethernet packets that are destined for a device connected to the USB would not be seen by any processes on the cable modem portion of the broadband gateway 135 since any filtering and processing of the packets are performed by the residential gateway portion. The dual bridge logical architecture means that packets that do not need to cross the interface between the local and external networks are processed by a single bridge and do not cause any interference or place any processing load on the other bridge. Beneath each bridge is a separate driver layer, with the cable modem featuring a cable driver 310 and the residential gateway various drivers, such as an Ethernet driver 330, an USB driver 335, and a wireless driver 340. As previously discussed, should the broadband gateway 135 support other network types, the driver layer of the residential gateway would include an appropriate driver for that network type.

Above the two bridges is a single IP stack 320 that is shared by both bridges. Since both bridges share the IP stack 320, it performs the processing of packets provided by either bridge. It is possible to share the IP stack 320 between the two bridges since each bridge is essentially responsible for any processing of packets that do not cross the interface, and therefore the IP stack 320 does not need to process any localized packet traffic. The shared IP stack 320 reduces the redundancy inherent in a dual-bridge architecture, such as one displayed in FIG. 2b. Above the shared IP stack 320 on the broadband modem portion is a cable applications layer 325. The cable applications layer 325 is similar to other cable application layers previously discussed.

When packets need to cross the local network and external network interface, i.e., a packet with a local network source address and an external network destination address (and vice versa, a packet from an external device with the destination address being the global NAT address pertaining to an internal device's address), a virtual data link 350 connecting the local bridge 345 to the cable bridge 315 (and vice versa) is used. The virtual data link 350 permits packets needing to cross the interface to move from one portion of the broadband gateway 135 to the other. For example, a local packet addressed to some destination in the external network will cross the virtual data link 350 and enter the cable bride 315. According to a preferred embodiment of the present invention, packet filtering (including address filtering) and network address translation can be performed in the virtual data link 350. The virtual data link 350 is a natural place to perform the packet filtering and network address translation due to its position in the partition of the two bridges. This will be done either internally within the virtual data link 350 or by the virtual data link providing the packet to a dedicated module for packet processing (e.g. NAT and firewall modules). After entering the cable bridge 315, the packet is injected into the external network via the cable driver 310.

According to a preferred embodiment of the present invention, the transfer of the packet in the virtual data link 350 may be implemented as simply as a transfer of a memory address. For example, a packet that needs to cross the virtual data link 350 is stored in memory. In fact, it is normal to store packets in memory and therefore, does not require any additional operations. The memory address of the packet in the memory is transferred from one bridge to the other bridge via the virtual data link 350. The address of the packet is provided to the virtual data link 350 by the source bridge (for example, the local bridge 345) and is in turn provided to the receiving bridge (for example, the cable bridge 315). The receiving bridge then simply references the memory location specified in the address. The packet has just traversed the virtual data link 350 without actually being moved. This technique involves minimum data transfer. Any packet filtering and network address translation, along with other operations such as firewall functionality, can be performed after the memory address is provided to the virtual data link 350 and before it is given to the destination bridge.

Alternatively, rather than passing the memory address between bridges, the entire packet may be passed. The source bridge can write the entire contents of the packet into the memory space of the virtual data link 315 and the virtual data link 315 passes the packet onto the destination bridge. The entire packet may need to be passed due to the design of the broadband gateway 135 is implemented. One possible cause is if the memory space for each of the two bridges is disjoint (not shared) and the only way to move information between the two memories is to physically transfer the information.

Use of the virtual data link 350 permits the logical separation of the two bridges 315 and 345 while permitting the sharing of the same IP stack 320. By keeping the two bridges separate, the processing of external and local packets can be kept separate. The separation of the bridges can even allow each bridge to be implemented using separate modules, even if the modules are executing on the same processing element. Through the use of separate modules, interaction between the processing performed by the two bridges is reduced. Typically, when applications are implemented as separate modules, interaction can only be achieved via specified methods and not by arbitrary methods developed by the creator of the applications such as illegal accesses to a shared memory, therefore, interaction between the modules are reduced and controlled. By reducing the interaction, there is a reduced chance of errors resulting from unintended corruption of data and memory. The reduction in the interaction between the modules also permits better balancing the processing resources allocated to the processing of the external packets and local packets in the respective bridges. This makes it easy to achieve maximum overall processing rate and efficiency.

The use of separate bridges, application and driver layer modules, also permits the designer to concentrate on the design of each module. Additionally, a change made to one module does not necessarily affect another module, since each are designed to operate independently of one another. This allows the continued fine-tuning of the modules without affecting the other modules in a negative way. Also, for many technical standards, devices that advertise adherence to the technical standard must undergo elaborate compliance testing. Should a device be modified after it has passed compliance testing, it could be required to be retested for compliance. Unfortunately, compliance testing can be expensive, both in terms of money and time expended. Therefore, a single bridge architecture would imply that modifications to the residential gateway portion of a broadband gateway could result in a change in the broadband gateway sufficient to require repeated compliance testing. The dual bridge architecture of FIG. 3 enables the continued development of the residential gateway portion of a broadband gateway without modifying the broadband modem portion of the broadband gateway 135; hence, repeated compliance testing may not be needed, or is reduced considerably.

Figure 4:
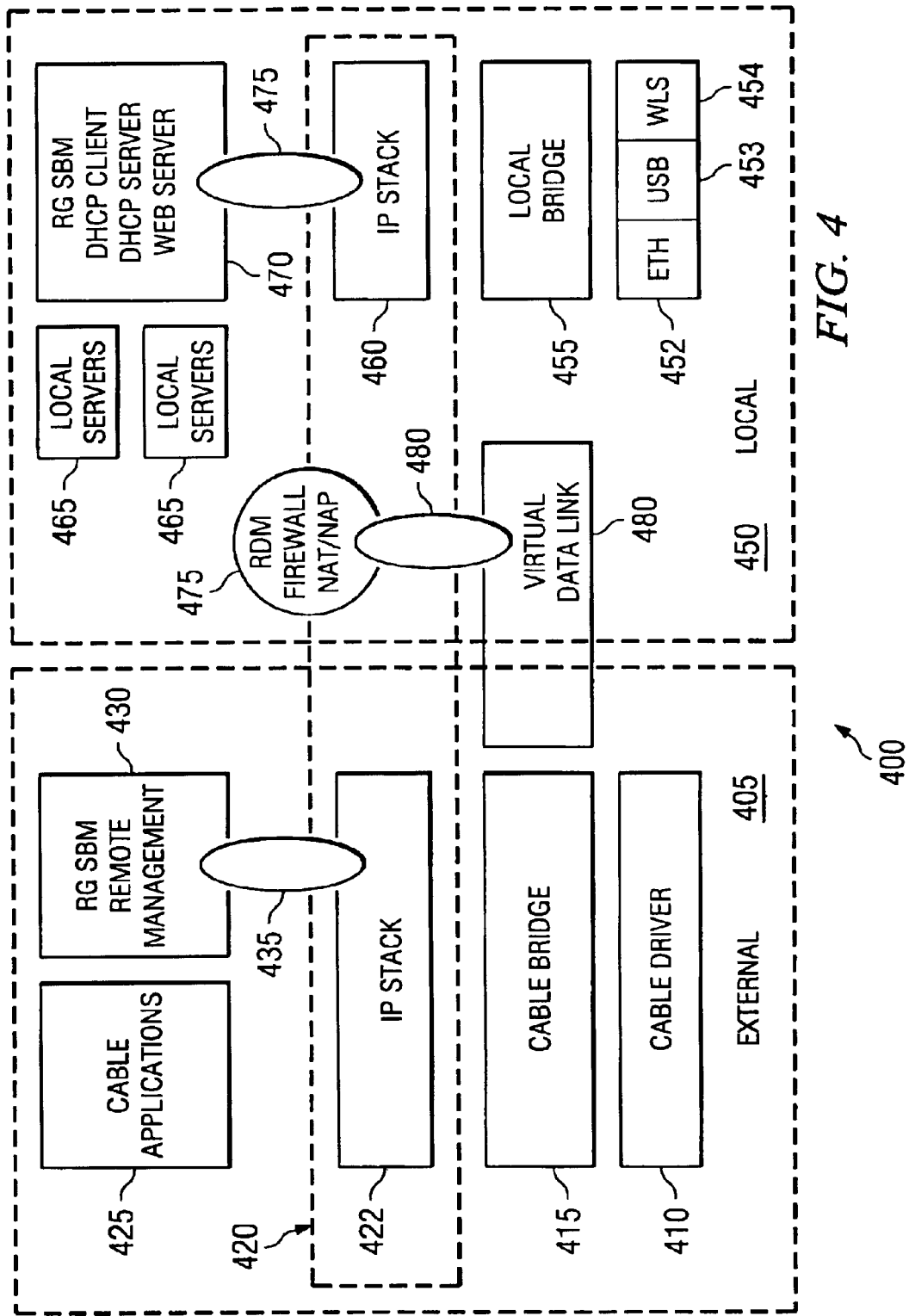
FIG. 4 illustrates a software architecture of a dual-bridge, shared module cable broadband gateway according to a preferred embodiment of the present invention.

Referring now to FIG. 4, a diagram illustrates a software architecture 400 of the broadband gateway 135 featuring a dual bridge, shared module design according to a preferred embodiment of the present invention. The software architecture 400 displays the various software modules, applications, and processes that control the broadband gateway 135. The software architecture 400 of the broadband gateway 135 is similar in appearance to the logical architecture with the inclusion of several socket-based services and datapath modules. Socket-based services are functional components that use the standard socket interface and datapath modules manipulate the packets. Examples of socket-based services include a dynamic host configuration protocol server (DHCP server), hypertext transfer protocol server (HTTP server), etc. Datapath modules may include firewall, network address translation, filtering, etc. The software architecture 400 can be divided into an external group 405 and a local group 450 of modules, with the external group 405 encompassing the functionality of the broadband modem and the local group 450 encompassing the residential gateway. The groups are mutually exclusive, although, there are modules that have parts in both groups. The partitioning of the external 405 and local 450 groups falls along logical lines such as those discussed in the logical architecture displayed in FIG. 3.

The external group 405 includes a cable driver module 410, a cable bridge module 415 and an IP stack module 422 that is actuality a part of a shared IP stack 420. Above the IP stack module 422 is a cable applications module 425. The local group 450 includes a driver layer with driver modules for supported network connections, such as Ethernet 452, USB 453, and wireless 454 modules. Above the driver layer module is a local bridge module 460 that is responsible for converting the packets provided by the driver layer into a format that is usable by an IP stack module 460 and the rest of the system. The IP stack module 460 of the local group is also part of the shared IP stack 420, like the IP stack module 422 of the external group. Finally, above the IP stack module 460 are some local socket-based services 465 that may be added by a vendor of the broadband gateway 135. The local socket-based services 465 may or may not be present depending on the particular vendor. The vendor of the broadband gateway 135 may decide to include local socket-based services such as network management, open services gateway initiative (OSGI), simple network management protocol (SNMP), etc.

While the logical architecture displayed in FIG. 3 illustrates the IP stack 320 as a single logical entity, the software architecture displays its shared IP stack 420 as being partitioned into two parts. The first IP stack module 422 is present in the external group 405 and is used to provide typical IP stack functionality for the broadband modem portion of the broadband gateway. The second IP stack module 460 is present in the local group 450 and is used to provide typical IP stack functionality for the residential gateway portion of the broadband gateway. Note that while the software architecture displays two IP stacks 422 and 460, the two IP stacks may be viewed as functions (or processes) within the shared IP stack module 420.

In FIG. 3, the virtual data link 350 spans the cable bridge 315 and the local bridge 345. In FIG. 4, a virtual data link module 480 also spans the cable bridge 415 and the local bridge 455 modules. However, rather than being in either the external or the local group, the virtual data link module 480 is in both the external group 405 and the local group 450. As a result, portions of the virtual data link module 480 reside in the external and local groups. This is due to the function of the virtual data link module 480, which is to permit packets from the cable bridge module 415 to move to the local bridge module 455 (and vice versa), therefore, portions of the virtual data link module 480 are present in both groups.

The software architecture as displayed in FIG. 4 also illustrates several residential gateway components and how they fit into the architecture of the broadband gateway 135. The external group 405 includes a residential gateway (RG) socket-based module (SBM) 430 that communicates with the IP stack 422 via sockets 435. The RG SBM 430 includes functionality such as remote management of the residential gateway 135. Remote management allows an administrator to remotely control and configure the residential gateway 135, hence, the presence of the RG SBM 430 in the external group 430. The local group 450 also contains a RG SBM 470. The local group's RG SBM 470 includes functionality such as a DHCP client (to receive addressing/configuration information from the external network), a DHCP server (to serve addressing/configuration information to computers and devices within the local network), and a web server.

In addition to the RG SBM 470, the local group 450 has a RG datapath module (RDM) 475. The RDM 475 performs tasks such as network address translation (NAT) and firewall functionality. The RDM 475 performs these tasks (and others) on packets that traverse the boundary between the external and local groups.

Figure 5:
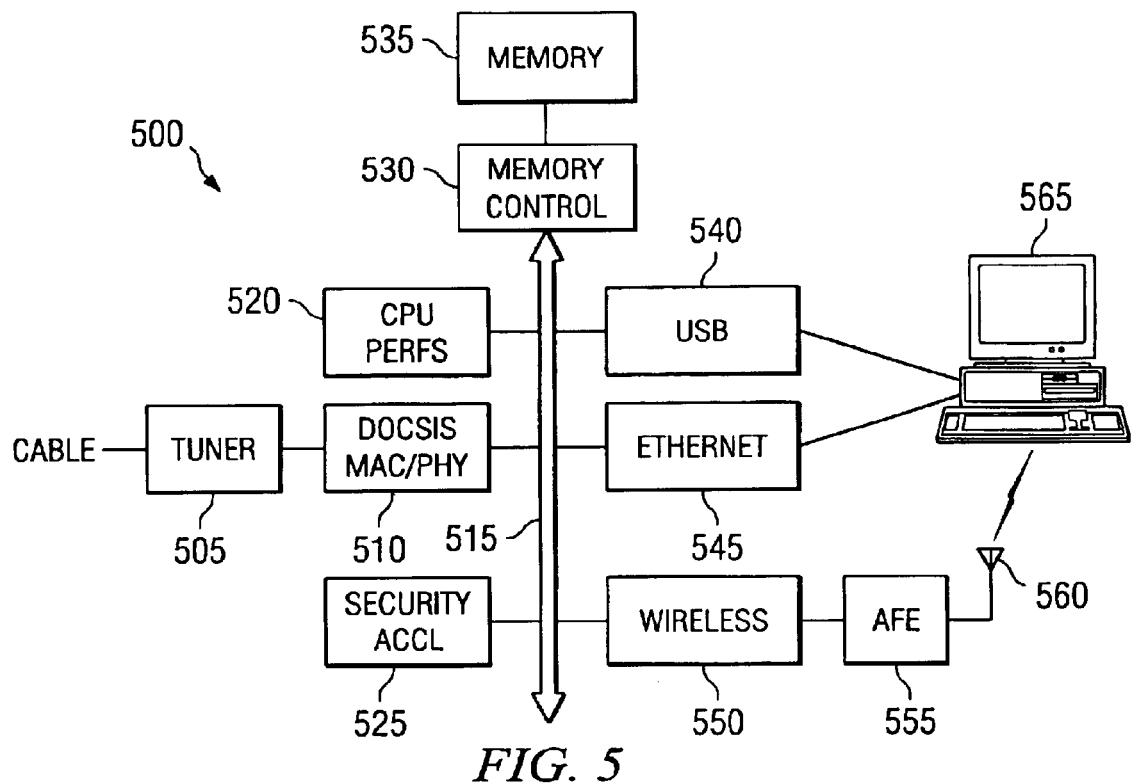
FIG. 5 illustrates a hardware implementation of a cable broadband gateway according to a preferred embodiment of the present invention.

Referring now to FIG. 5, a block diagram illustrates a hardware view of the broadband gateway 500 according to a preferred embodiment of the present invention. The broadband gateway 500 has a broadband input, in this case, a coaxial cable input. The coaxial cable input is responsible for carrying the information (data) to and from the broadband gateway 500. Coupled to the coaxial cable input is a tuner 505. The tuner 505 is used to selectively select a communications channel from a plurality of possible communications channel. If the broadband medium should happen to be an optical medium (or some other medium), then the tuner 505 may replaced with a different circuit that can select the desired communications channel from those carried on the broadband medium.

Carried in the communications channel is a data/information stream (typically, a bi-directional stream) that contains the actual information being received and transmitted by the computer(s) and digital device(s) connected to the broadband gateway 500. The information stream is forwarded to a DOCSIS MAC/PHY layer processor 510, where the information stream (in its encoded form) is converted into a standardized data format, such as a data packets or even a raw data stream that can be used by the devices connected to the broadband gateway 500. For example, the DOCSIS MAC/PHY layer processor 510 can provide a stream of Ethernet packets with IP packets encapsulated therein. In addition to the format conversion, the DOCSIS MAC/PHY processor 510 can perform tasks such as low-level error detection and correction and encryption and decryption. Note that should the broadband medium be different from coaxial cabling, a different MAC/PHY processor would be used. The converted information stream is provided to a common bus 515 by the DOCSIS MAC/PHY processor 510. The common bus 515 is used by devices and functional units in the broadband gateway 500 to share and exchange control information and data.

Connected to the common bus 515 is a central processing unit (CPU) 520. The CPU 520 is responsible for performing any decoding, high-level error detection and correction, high-level signaling, IP packet processing, address translation, etc. For example, the CPU 520 would be responsible for implementing a large amount of the residential gateway functionality of the broadband gateway 500 as well as any socket-based modules and data modules. Optionally coupled to the common bus 515 is a security accelerator 525. The security accelerator 525 can be used to off-load the security processing from the CPU 520. Most communications have a certain level of security built-in to protect the contents being transmitted. While the security used may not be extremely strong, it can still consume a large amount of processing cycles from the CPU 520. Therefore, it can be beneficial to have a co-processor that is optimized to perform those tasks to free the CPU 520 to perform other tasks.

A memory controller 530 and its attendant memory 535 are also coupled to the common bus 515. The memory controller 530 controls all access (reads and writes) to the memory. The memory 535 may include, but is not limited to random access memory (RAM), read-only memory (ROM), flash programmable memory, etc.

Also coupled to the common bus 515 is a set of output connections for the broadband gateway 500. For example, if the broadband gateway 500 provides connectivity to a computer or computer network via an Ethernet port or a USB port, then coupled to the common bus 515 would be appropriate circuitry (540 and/or 545) for an Ethernet or USB port. Any required software support for the network connectivity could be provided in the CPU 520, or in specially designed controllers (not shown). If the broadband gateway 500 supports wireless connectivity, then an appropriate wireless circuit 550 and an analog front end (AFE) 555, along with an antenna 560 would be present.

As discussed previously, the broadband gateway 500 when implemented using a dual bridge, shared module architecture can be implemented as a single unit or circuit board. A single circuit board implementation has advantages of reduced redundancy in support circuitry as well as power supplies, connectors, housings, etc. This results in a lower overall cost for the broadband gateway 500.

Figure 6:
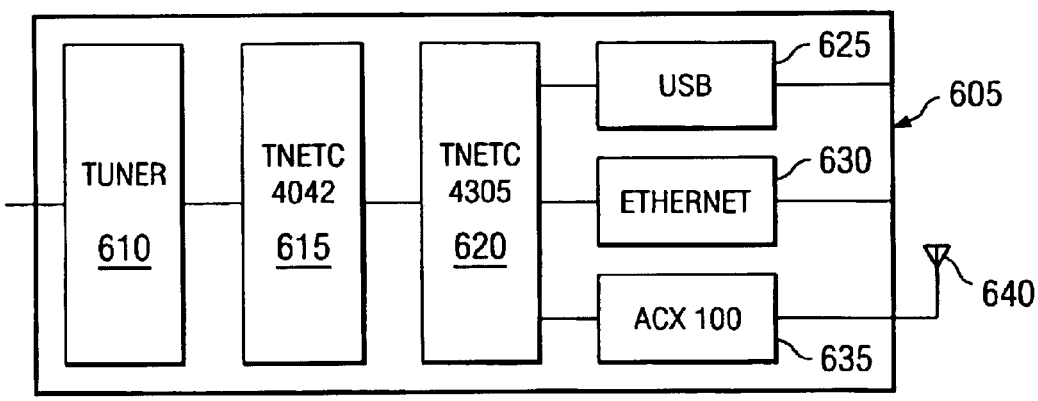
FIG. 6 illustrates a single card implementation of a cable broadband gateway according to a preferred embodiment of the present invention.

Referring now to FIG. 6, a block diagram illustrates a single board implementation of the broadband gateway 605 according to a preferred embodiment of the present invention. The broadband gateway 605 includes a tuner 610 that is coupled to a DOCSIS MAC/PHY processor 615. An example of a DOCSIS MAC/PHY processor 615 that would be usable in the broadband gateway 605 would be a Texas Instruments TNETC 4042 integrated MAC/PHY integrated circuit. The TNETC 4042 is certified for DOCSIS technical standard version 1.1. Coupled to the DOCSIS MAC/PHY 615 is a processing element 620. An example of a processing element 620 would be a Texas Instruments TNETC 4305. The TNETC 4305 is a processor with built in communications peripherals. Finally, coupled to the processing element 620 are a series of integrated circuits used to provide connectivity to the broadband gateway 605. These circuits include a USB interface circuit 625 and an Ethernet interface circuit 630. Should the broadband gateway 605 offer wireless connectivity through an IEEE 802.11 wireless Ethernet network, the broadband gateway 605 would also have a wireless interface circuit 635. An example of a wireless interface circuit 635 would be a Texas Instruments ACX-100. The ACX-100 is a single-chip MAC controller with an IEEE 802.11b compliant baseband processor. Also present, but not shown in FIG. 6, is a block of memory. The memory can be used to store code and as buffers for data arriving at and leaving the broadband gateway.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claim is:

1. A circuit comprising:
   a broadband modem coupled to a broadband medium, the broadband modem comprising:
      a broadband bridge coupled to a broadband connection, the broadband bridge containing circuitry to filter packets;
      a first Internet protocol (IP) layer coupled to the broadband bridge, the first IP layer to process data packets according to an Internet protocol;
   a residential gateway comprising:
      a local bridge coupled to a network connection, the local bridge containing circuitry to filter packets, wherein the local bridge is also coupled to the first IP layer; and
   the circuit further comprising a virtual data link coupled at a first end to the broadband bridge and at a second end to the local bridge, the virtual data link to allow packets from one bridge to cross into the other.

2. The circuit of claim 1, wherein the broadband modem further comprises a driver coupled to the broadband connection and the broadband bridge, the driver to perform low-level transmission and reception of packets.

3. The circuit of claim 1, wherein the residential gateway further comprises a driver coupled to the network connection and the local bridge, the driver to perform low-level transmission and reception of packets.

4. The circuit of claim 1, wherein the broadband modem further comprises an applications layer coupled to the first IP layer, the applications layer to provide socket-based server and client applications.

5. The circuit of claim 1, wherein the broadband medium is a coaxial cable.

6. The circuit of claim 1, wherein the broadband medium is a digital subscriber line (DSL).

7. The circuit of claim 1, wherein the local and broadband bridges operate independently of one another.

8. The circuit of claim 1, wherein the virtual data link performs firewall functionality on packets moving across the virtual data link.

9. The circuit of claim 1, wherein the virtual data link performs network address translation on packets moving across the virtual data link.

10. The circuit of claim 1, wherein packets are moved across the virtual data link by passing a memory address of where the packets are stored in memory across the virtual data link.

11. The circuit of claim 1, wherein the broadband modem, the residential gateway, and the virtual data link are located on a single circuit board.

12. The circuit of claim 3, wherein the driver is an Ethernet driver.

13. The circuit of claim 3, wherein the driver is a Universal Serial Bus (USB) driver.

14. The circuit of claim 3, wherein the driver is a wireless driver.

15. The circuit of claim 3, wherein the driver comprises an Ethernet driver, a Universal Serial Bus driver, and a wireless driver.

16. The circuit of claim 5, wherein the broadband modem is adherent to Data-Over-Cable Service Interface Specifications (DOCSIS) standard version 1.1.

17. The circuit of claim 7, wherein pockets needing to move from one bridge to the other bridge are transferred via the virtual data link.

18. The circuit of claim 14, wherein the driver is an IEEE 802.11 b wireless Ethernet driver.

19. The circuit of claim 17, wherein a packet needing to move across the virtual data link is written to a memory location by one bridge and the other bridge reads the packet from the memory location.

20. A method for increasing the eficiency of a broadband gateway, the method comprising:
   determining a destination and a source address of a packet;
   processing the packet in a first bridge if the destination and source addresses of the packet are external network addresses;

processing the packet in a second bridge if the destination and source addresses of the packet are local network addresses;

transferring the packet from one bridge to the other bridge over a virtual data link if the destination and source addresses of the packet belong to different networks; and completing the processing of the transferred packet wherein the virtual data link is coupled at a first end to the first bridge and at a second end to the second bridge, the virtual data link to allow packets from one bridge to cross into the other.

21. method of claim 20, wherein the first processing step comprises the step of filtering the packet.

22. The method of claim 20, wherein the second processing step comprises the step of filtering the packet.

23. The method of claim 20, wherein the transferring step comprises:

filtering the destination and source addresses of the packet;

translating the source address of the packet if the source address is a local network address; and translating the destination address of the packet if the destination address is a local network address.

24. The method of claim 20, wherein the completing step comprises:

injecting the packet into the local network if the packet was transferred to the second bridge; and injecting the packet into the external network if the packet was transferred to the first bridge.

25. The method of claim 20, wherein the transferring step involves the passing of a memory address of the packet.

26. The method of claim 20, wherein the two processing steps are independent of each other.

27. The method of claim 23, wherein the method further comprises the step of replacing the address translated with the translated address.

* * * * *